United States Patent
Sawara et al.

(10) Patent No.: US 6,402,831 B1
(45) Date of Patent: *Jun. 11, 2002

(54) CONCRETE CONTAINING AQUEOUS SLURRY OF GROUND CALCIUM CARBONATE

(75) Inventors: Haruya Sawara, Atsugi; Tadashi Yamauchi, Zama; Hidetoshi Morishita, Aikawa; Seiji Katayama, Koganei; Yumiko Takase, Kurashiki, all of (JP)

(73) Assignee: Fimatec, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/560,022

(22) Filed: Apr. 27, 2000

(51) Int. Cl.$^7$ .............................................. C04B 14/28
(52) U.S. Cl. .................. 106/738; 106/400; 106/464; 106/770; 106/816; 106/817
(58) Field of Search .................... 106/400, 464, 106/738, 770, 816, 817

(56) References Cited

U.S. PATENT DOCUMENTS

| | | | | |
|---|---|---|---|---|
| 4,354,877 A | * | 10/1982 | Kawano et al. | 106/90 |
| 5,273,578 A | * | 12/1993 | Towe | 106/482 |
| 5,346,546 A | * | 9/1994 | Kaliski | 106/436 |
| 5,584,926 A | * | 12/1996 | Borgholm et al. | 106/713 |
| 5,624,493 A | * | 4/1997 | Wagh et al. | 106/817 |

* cited by examiner

Primary Examiner—Elizabeth D. Wood
(74) Attorney, Agent, or Firm—Pitney, Hardin, Kipp & Szuch LLP

(57) ABSTRACT

Concrete characterized by containing aqueous slurry of ground calcium carbonate which has a mean particle diameter of 0.5–3 micrometers produced by wet pulverization of the limestone. By adding fine powder of ground calcium carbonate, fluidity of the concrete is increased and workability thereof is improved.

6 Claims, 1 Drawing Sheet

F I G. 1
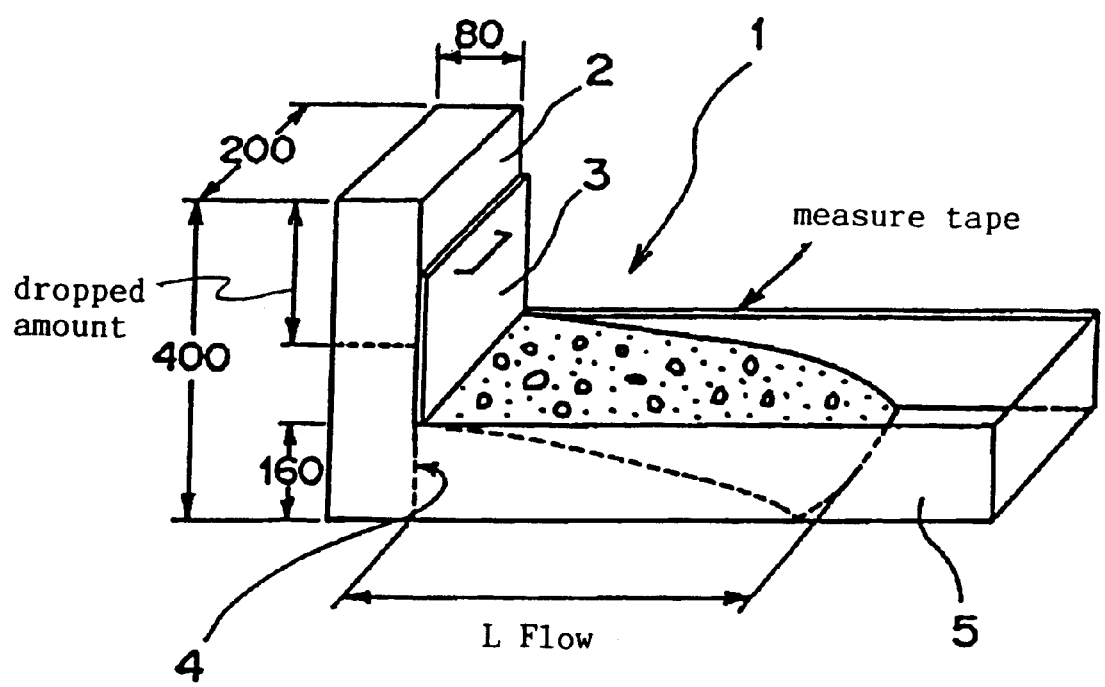

CONCRETE CONTAINING AQUEOUS SLURRY OF GROUND CALCIUM CARBONATE

BACKGROUND OF THE INVENTION

1. Field of the Invention

The present invention relates to concrete improved to have raised workability.

2. Description of the Related Art

Generally, in order to obtain concrete having high strength, water-cement ratio should be as small as possible (Hereinafter "water-cement ratio" and "water-powder ratio" which is used in case of mixing an admixture such as blast furnace slag fine powder, limestone fine powder, or silica fume, etc. in addition to cement, have the same meaning.). On the other hand, it is important that fresh concrete shows sufficient fluidity from a construction side in order to secure suitable workability.

However, in case that cement is a single component used as a fine particle material which constitutes concrete, if the water cement ratio becomes about 35% or less, the fluidity of concrete becomes very poor and it is difficult to secure satisfactory workability. Especially, the super high strength concrete having a design strength of 600 kgf/cm$^2$ class established in connection with high rising of a building, in other words, in case that waiter-cement ratio becomes about 25%, it has been a big problem to ensure the workability.

In order to solve the above problem, recently, a method of mixing comparatively large amount of blast furnace slag fine powder or limestone fine powder having a mean particle diameter of 1–3 micrometers, or silica fume having the mean particle diameter of 0.1–0.3 micrometers with cement is adopted. This method is based on an idea of filling up gaps among cement particles usually having the mean particle diameter of about 15 micrometers by supplying particles having the mean particle diameter of about 1–3 micrometers or particles having the mean particle diameter of about 0.1–0.3 micrometers, thereby simultaneously reducing frictional resistance among cement particles and frictional resistance between fine particles and aggregate, and, as a result, raising the fluidity of concrete and securing workability.

According to this method, the blast furnace slag fine powder, limestone fine powder, and silica fume which consist of a very fine particle compared with a cement particle are mixed, while remaining as fine particle, with other compounding ingredients at the time of kneading concrete. However, such fine particles having the mean particle diameter of 1–3 micrometers or less which consist of fine powder easily cause secondary aggregation in a powder state to form coarse powder, namely, have a tendency to form coarse particles. Accordingly, these particles, even though each particle is fine, cause secondary aggregation to form coarse powder which cannot sufficiently fill up gaps among cement particles when they are mixed with cement. As a result, there is a defect that an improvement in fluidity is not sufficient. This is one of the reasons to use comparatively large amount of such fine powder.

Moreover, since the particle diameter of the blast furnace slag particle or the limestone particle obtained in a usual dry type pulverization process using the ball mill or roll mill is around 15 micrometers, it is necessary to use a special pulverizer for producing the blast furnace slag fine powder or the limestone fine powder having the mean particle diameter of 1–3 micrometers or to employ complicate milling process. To obtain such fine power is not only troublesome but causes a problem of producing expensive material because of high production cost. Because of the above problem, when such fine powder is used so much as admixtures of concrete, it becomes disadvantageous in respect of cost, and it is difficult to put such a method to practical use. Further, silica fume has a similar problem because expensive product imported from overseas is used.

SUMMARY OF THE INVENTION

Therefore, a method which can increase the fluidity of concrete more effectively than the conventional method using the above mentioned blast furnace slag fine powder or limestone fine powder in dried condition, and simultaneously, produce easily such powder is expected. The object of the present invention is to increase the fluidity of concrete more effectively by using limestone powder and to provide improved concrete having solved the above problem by supplying limestone powder used in concrete comparatively simple method.

As a result of research to solve the above problems, the inventors have found;

(1) without using a special pulverizer or complicate pulverizing process, but employing wet milling method which can mill limestone into fine powder, the particles of ground calcium carbonate obtained from the limestone and having the mean particle diameter of 0.5–3 micrometers exist in such condition that each particle is dispersed without causing the above-mentioned secondary aggregation in an aqueous slurry thereof. Therefore, by using only comparatively small amount of this slurry as an admixture or a powder material of the concrete, each particle fills easily into gaps among cement particles and gaps among paticles of cement and aggregate. As a result of ground calium carbonate particles filling up sufficiently these gaps, frictional resistance between cement particles and that of cement particle and aggregate are remarkably reduced and the fluidity of the concrete is increased, and (2) when silca fume consisting of silica particles having the mean particle diameter of 0.1–0.3 micrometer is used in addition to the aqueous slurry of above-mentioned ground calcium carbonate, since this silica particle is more fine than ground calcium carbonate particle, it further goes into gaps among cement particles, gaps between cement particle and aggregate, and gaps among cement particle, ground calcium carbonate particle and aggregate thereby futher being able to fill up these gaps. As a result, frictional resistance between cement particles and that of cement particle and aggregate and frictional resistance among cement particle, ground calcium carbonate and aggregate are remarkably reduced and the fluidity of the concrete is increased.

The present invention was achieved based on the above finding and relates to:

1. Concrete characterized by containing aqueous slurry of ground calcium carbonate having the mean particle diafmeter of 0.5–3 micrometers produced by wet pulverization of the limestone, and
2. Concrete characterized by containing aqueous slurry of ground calcium carbonate having the mean particle diameter of 0.5–3 micrometers produced by wet pulverization of the limestone and silica fume which comprises silica particles having the mean part diameter of 0.1–0.3 micrometers.

BRIEF DESCRIPTION OF DRAWING

FIG. 1 is a perspective view showing a measuring jig for conducting L flow test wherein the numerals therein mean:

1: measuring jig for conducting L flow test
2: vertical box part
3: divider
4: opening
5: horizontal box part

DESCRIPTION OF THE INVETION

The aqueous slurry of ground calcium carbonate having the mean particle diameter of 0.6–3 micrometers used in the present invention can generally be prepared by any type of wet pulverization, however it is preferable to prepare it, for example, by the method invented and filed by the applicant (JP-A-9-150072). According to this method, the aqueous slurry of ground calcium carbonate having the mean particle diameter of 0.5–3 micrometers is prepared by coarsely pulverizing massive limestone having a particle size of 45 mm or less by using upright roll mill until the mean particle diameter thereof becomes 50 micrometers or less, adding 25–100 weight parts of water and 0.1–10 weight parts of dispersant to 100 weight parts of the limestone powder thus obtained and applying wet medium stirrig pulverizing method to this mixture. As the dispersant, polycarboxylic acid type-, naphthalene type-, melamine type-, and amino sulfonic acid type-dispersant and etc. are used preferably in this method.

In the present invention, the mean particle diameter of ground calcium carbonate is defined as the particle size at 50 weight % of the particle size distribution curve obtained by measuring the particle size of ground calcium carbonate in the aqueous slurry thereof, which is measured by using laser diffraction type particle size distribution measurement equipment (for example, Mirotrac X100 made by Nikkiso Co., Ltd.). Since ground calcium carbonate particles used in the present invention and dispersed in the aqueous slurry have the mean particle diameter of 0.5–3 micrometers, which is more fine than the cement particles having the mean particle diameter of about 15 micrometers, these particles go into the gaps among cement particles and reduce the frictional resistance between cement particles and thereby increase the fluidity of the concrete.

When the mean particle diameter of ground calcium carbonate exceeds 8 micrometers, sedimentation of particles in the aqueous slurry occurs remarkably and troublesome problem arises in storage and transportation of aqueous slurry. On the other hand, when the mean particle diameter becomes smaller than 0.5 micrometers, it takes too much time for pulverization accompanying the increase in amount of energy consumption. Therefore, the mean particle diameter of ground calcium carbonate in aqueous slurry was determined as 0.5–3 micrometers.

When the more the mean particle diameter of ground calcium carbonate becomes smaller within the above range, generally the more, particles easily suspend in water and sedimentation of particles is reduced and as a result it is easy to handle. Accordingly, it is desirable that ground calcium carbonate particle having particle size of 2 micrometers or less amounts to 60% or more based the total weight of the particle.

In the aqueous slurry used in the present invention, when the ratio of water to ground calcium carbonate becomes 1 or more, viscosity of the slurry is lowered, sedimentation is accelerated and troublesome problem arises in storage and transportation of the aqueous slurry. On the other hand, when the above ratio becomes 0.25 or less, the viscosity of the slurry is increased and it is difficult to handle. Generally, the ratio of water to ground calcium carbonate is preferably 0.25–1, more preferably 0.3–0.4.

The amount of ground calcium carbonate to be added to 1 $m^3$ of concrete can be varied suitably according to mix proportion of the concrete or water-powder ratio to be aimed, however, when the amount exceeds 150 $kg/m^3$, not only the amount of ground calcium carbonate which do not contribute to improve a packing density increases because excessive amount of ground calcium carbonate is added, but also it causes to lower strength of the cured concrete when it is used to substitute cement. On the other hand, when the above amount is less than 5 $kg/m^3$, sufficient packing density is not achieved, and the sufficient efect in fluidity is not exhibited. Generally, the amount of ground calcium carbonate to be added is preferably 5–150 $kg/m^3$, and more preferably 10–100 $kg/m^8$.

The present invention is favorably applied to the high strength concrete or the super high stength concrete in which the water-cement ratio is 20–35%. Here, water called in this "water-cement ratio" means all water contained in concrete, i.e., water in the above-mentioned water slurry, and water usually called blending water or kneading water.

When the silica fume comprising the silica particles having the mean particle diameter of 0.1–0.3 micrometer is blended with concrete which is blended the above-imentioned aqueous slurry of ground calcium carbonate, concrete having increased fluidity is obtained and such concrete is also included in the present invention. In such concrete, since the particle size distribution in the whole particles becomes smooth by presence of silica fume having the mean particle diameter of 0.1–0.3 micrometer, ground calcium carbonate having the mean particle diameter of 0.5–3 mircometers and cement having the mean particle diameter of about 15 micrometers, the packing density of the whole powder is increased, i.e., gaps among particles are reduced, frictional resistance between the particles is further lowered and thereby the fluidity is much more increased.

In such concrete containing silica fume, although the weight ratio of the silica fume to ground calcium carbonate can be suitably varied according to mix proportion or the water-powder ratio to be aimed, when it exceeds 9 or more, the amount of ground calcium carbonate having the mean particle diameter, of 0.5–3 micrometers is insufficient and a gap grade arises in the particle size distribution covering the whole particles thereby lowering the effect in improving the fluidity by the ground calcium carbonate. On the other hand, when it becomes smaller the 0.1, the same result is caused. Generally: this weight ratio is preferably 0.1–9, and more preferably 0.2–4.

The aqueous slurry of ground calium carbonate can be usd so that ground calcium carbonate replaces a part of powder binding materials, such as cement, namely, so that it becomes inner ratio to cement and etc., or replace a part of fine aggregate (sand), namely, so that it becomes outer ratio to cement as powder binding materials. The present invention can be applied to any type of conventional concrete or concrete having different kind of mix proportion and is preferably applied to the high strength or the super high strength concrete having the water-powder ratio of 20–35%. A typical example of the mix proportion of concrete to which the present invention is applied is shown below.

Case 1 In case that only ground calcium carbonate is added as the powder ingredient.

| Cement | 400–700 kg/m³ |
|---|---|
| Fine aggregate | 600–950 kg/m³ |
| Coarse aggregate | 750–1050 kg/m³ |
| Ground calcium carbonate | 5–100 kg/m³ |
| Water | 140–175 kg/m³ |

The following mix proportion is chosen as more preferable composition range.

| Cement | 450–650 kg/m³ |
|---|---|
| Fine aggregate | 650–850 kg/m³ |
| Coarse aggregate | 850–950 kg/m³ |
| Ground calcium carbonate | 10–50 kg/m³ |
| Water | 150–170 kg/m³ |

Case 2 In case that both ground calcium carbonate and silica fume are added as the powder ingredient.

| Cement | 500–800 kg/m³ |
|---|---|
| Fine aggregate | 550–900 kg/m³ |
| Coarse aggregate | 750–1050 kg/m³ |
| Ground calcium carbonate | 5–100 kg/m³ |
| Silica fume | 20–120 kg/m³ |
| Water | 140–175 kg/m³ |

The following mix proportion is chosen as more preferable compositon rage.

| Cement | 550–750 kg/m³ |
|---|---|
| Fine aggregate | 600–800 kg/m³ |
| Coarse aggregate | 850–950 kg/m³ |
| Ground calcium carbonate | 10–50 kg/m³ |
| Silica fume | 25–100 kg/m³ |
| Water | 150–170 kg/m³ |

In any of above cases, ground calcium carbonate implies the amount of solid contents. Further, water implies the amount of sum of the water in the aqueous slurry of ground calcium carbonate and the water separately added to blend the mixture. The amount of water and powder containing cement is chosen so that water-powder ratio becomes 20–35%.

The above-mentioned example is applicable to not only the high strength concrete or the super high strength concrete whose water cement ratio is small, but also any kinds of concrete whose water cement ratio reaches to 65% in order to improve workability.

Among the above-mentioned concrete, the present invention is preferably applied to concrete for spraying tunnel. The following is the mix proportion for this concrete.

Case 3 In case that only ground calcium carbonate is added as the powder ingredient.

| Cement | 300–500 kg/m³ |
|---|---|
| Fine aggregate | 800–1100 kg/m³ |
| Coarse aggregate | 500–800 kg/m³ |
| Ground calcium carbonate | 30–150 kg/m³ |
| Water | 160–230 kg/m³ |
| Accelerating agent | 10–45 kg/m³ |

The following mix proportion is chosen as more preferable composition range.

| Cement | 360–400 kg/m³ |
|---|---|
| Fine aggregate | 900–1050 kg/m³ |
| Coarse aggregate | 600–750 kg/m³ |
| Ground calcium carbonate | 50–100 kg/m³ |
| Water | 180–220 kg/m³ |
| Accelerating agent | 15–30 kg/m³ |

Case 4 In case that both ground calcium carbonate and silica fume are added at the powder ingredient.

| Cement | 300–500 kg/m³ |
|---|---|
| Fine aggregate | 800–1100 kg/m³ |
| Coarse aggregate | 500–800 kg/m³ |
| Ground calcium carbonate | 30–150 kg/m³ |
| Silica fume | 10–75 kg/m³ |
| Water | 160–230 kg/m³ |
| Accelerating agent | 10–45 kg/m³ |

The following mix proportion is chosen as more preferable composition range.

| Cement | 330–450 kg/m³ |
|---|---|
| Fine aggregate | 900–1050 kg/m³ |
| Coarse aggregate | 600–750 kg/m³ |
| Ground calcium carbonate | 50–100 kg/m³ |
| Silica fume | 15–50 kg/m³ |
| Water | 180–220 kg/m³ |
| Accelerating agent | 15–30 kg/m³ |

Admixtures commonly used in producing concrete, such as an air entraining agent, a water reducing agent, an air entraining water reducin agent, a superplasticizer, an air entraining and high-range water reducing agent, a viscosity improver and an accelerating agent can be optionally added to the concrete of the present invention if necessary.

The concrete of the present invention can generally be prepared by mixing and kneading the blending component described above in any way, for example, by feeding cement, the aqueous slurry of ground calcium carbonate, the fine aggregate, water, the admixture, and further silica fume according to the mix proportion, into a mixer and pre-kneading the mixture of mortar, adding the coarse aggregate to the mortar and then kneading the mixture; or by feeding cement, the fine aggregate, the coarse aggregate, and further silica fume according to the mix proportion, into the mixer, dry kneading the mixture, adding water, the aqueous slurry of ground calcium carbonate and admixtures and kneading the mixture; or by feeding the above components other than the aqueous slurry of ground calcium carbonate into the mixer to prepare concrete and then adding the aqueous slurry of ground calcium carbonate into the mixer or agitator car and kneading the mixture.

EXAMPLES

Now the present invention will be described in detail in connection with the following examples, but it is not intended to restrict the present invention by these examples.

Example 1

Materials shown in the Table 1 are used as blending components in each concrete of this example.

TABLE 1

Materials Used

| Blending Component | Abbr. | Kind of Materials Used |
|---|---|---|
| Cement | OPC | Normal portland cement, specific gravity 3.16 (Chichibu-Onoda Co., Ltd..) |
| | HFC | High belite type cement, specific gravity 3.20 (Chichibu-Onoda Co., Ltd..) |
| Find Aggregate | S1 | Fine sand from Ichihara (30%), specific gravity 2.54, FM 1.40 |
| | S2 | Coarse sand from the Sagami River (70%), specific gravity 2.57, FM 3.20 |
| Coarse Aggregate | G | Crushed stone from Shiroyama, Tsukui-gun, specific gravity 2.66, percentage of absolute volume 57.2% |
| Admixture | FMT | Aqueous slurry of ground calcium carbonate obtained by wet milling |
| Admixture | SP | Polycarboxylic acid type air entraining and high-range water reducing agent |

FM Means Fineness Modulus.

According to method described in the above-mentioned JP-A 9-150072, the massive limestone having a particle size of 45 mm or less was coarsely pulverized to obtain limestone powder having the mean particle diameter of 10 micrometers by using a vertical roller mill, 35 weight parts of water and 0.5–1.0 weight part of polycarboxylic acid type dispersant, respectively per 100 weight parts of limestone powder, were added to thus obtained limestone powder and the mixture was subjected to wet medium mixing pulveriation to produce aqueous slurry of ground calcium carbonate having the mean particle diameter of 1.402 micrometers. This aqueous slurry contained 75.60 weight % of ground calcium carbonate.

TABLE 2

Mix proportion of concrete

| Sample | W/P(%) | W | C | FMT | S1 | S2 | G | SP (P × %) |
|---|---|---|---|---|---|---|---|---|
| Comparative Sample 1 | 25 | 160 | 640 | 0 | 205 | 480 | 907 | 1.40 |
| Invention Sample 1 | | | 633.6 | 6.4 | 205 | 479 | | 1.35 |
| Invention Sample 2 | | | 620.8 | 19.2 | 204 | 478 | | 1.30 |
| Invention Sample 3 | | | 608 | 32.0 | 203 | 477 | | 1.30 |
| Comparative Sample 2 | 30 | 165 | 550 | 0 | 223 | 521 | 907 | 1.20 |
| Invention Sample 4 | | | 544.5 | 5.5 | 223 | 520 | | 1.05 |
| Invention Sample 5 | | | 533.5 | 18.5 | 223 | 519 | | 1.00 |
| Invention Sample 6 | | | 522.5 | 27.5 | 222 | 519 | | 0.90 |
| Comparative Sample 3 | 35 | 170 | 486 | 0 | 233 | 544 | 907 | 1.00 |
| Invention Sample 7 | | | 481 | 5.0 | 233 | 544 | | 1.00 |
| Invention Sample 8 | | | 471.2 | 14.6 | 233 | 543 | | 0.95 |
| Invention Sample 9 | | | 461.7 | 24.3 | 232 | 542 | | 0.95 |

W/P: water–powder ratio, P = C + FMT
W/P = 25, 30% is high belite type cement
W/P = 35% is normal portland cement
Amount of ingredient is shown as solid basis.

Based on the mix proportion shown in Table 2, the invention samples 1–9, and the comparative samples 1–3 were prepared respectively according to the following procedure using the above ingredients.

Cement, the fine aggregate, and the coarse aggregate were fed into a mixer and were subjected to dry kneading for 30 seconds, then the air entraining and high-range water reducing agent, the aqueous slurry of ground calcium carbonate and water were added thereto and the mixture was kneaded for 120 seconds (in cases of the water powder ratio being 35% and 30%) or for 180 seconds (in case of the water powder ratio being 25%) to produce concrete samples. In this example, the aqueous slurry of ground calciuxm carbonate was added after mixed with a part of water to be added.

Samples thus prepared were subjected to slump flow test using the slump flow measuring machine and the measuring method therefor and L flow test using the L flow measuring machine shown in FIG. 1 and the measuring method therefor.

Slump flow test: Concrete is filled in a slump corn having a height of 30 cm, an inside diamneter of the lower end of 20 cm and an inside diameter of the upper end of 10 cm, separately in three times, in each time filling ⅓ volume portion thereof, pushing a set number of times with a standard stick. After filling the total amonunt of the concrete, the corn is pulled up vertically and the concrete spreads on the flat plate while getting out of shape according to its softness. After the movement of the concrete stops, the lengths of both lengthwise and crosswise of the spread portion is measured and find the mean value. This value shown in unit of cm is defined as the slump flow value.

L flow test: After concrete is filled in vertical box part 2 of measuring machine shown in FIG. 1 having a height of 40 cm, a width of 8 cm and a length of 20 cm and a divider 3 is pulled up, the concrete in the box part flows toward an oblong box part 5 through an opening 4 provided in one lower side of the box part 2 having a height of 16 cm and length of 20 cm. The flowing time required to reach each flow distance of concrete is measured.

In the slump flow test, the slump flow value and 50 cm-flow time, i.e., the time required for the slump flow value of the concrete reaches to 60 cm after the slump corn was pulled up were measured. In the L flow test, the time required for flow distance of flowing concrete reaches to 30 cm, 40 cm and 50 cm respectively, after the divider was pulled up, i.e., 30 cm-, 40 cm- and 50 cm-flow time were measured.

The "Uncured concrete test by air volume pressure (air-chamber pressure method)" according to JIS A 1128 was also carried out to each sample and air volume thereof was measured. Further, the compressive strength of age 28 days of each cured concrete obtained from these samples was measured. The results are shown in Table 3.

TABLE 3

| Sample | W/P (%) | FMT (Kg/m3) | Slump Flow Time (cm) | 50 cm Flow (sec.) | L Flow Time (sec.) 30 cm | L Flow Time (sec.) 40 cm | L Flow Time (sec.) 50 cm | Air Volume (%) | Compressive Strength of 28 days (N/mm3) |
|---|---|---|---|---|---|---|---|---|---|
| Comparative Sample 1 | 25 | 0 | 66.0 | 11.4 | 11.5 | 19.0 | 33.3 | 2.7 | 89.8 |
| Invention Sample 1 |  | 6.4 | 68.5 | 7.2 | 8.1 | 12.6 | 19.7 | 2.6 | 92.3 |
| Invention Sample 2 |  | 19.2 | 67.5 | 7.2 | 6.2 | 10.4 | 16.1 | 3.2 | 90.0 |
| Invention Sample 3 |  | 32.0 | 66.0 | 8.1 | 6.0 | 9.7 | 15.6 | 3.3 | 89.7 |
| Comparative Sample 2 | 30 | 0 | 63.0 | 7.5 | 5.2 | 9.3 | 18.6 | 4.0 | 76.0 |
| Invention Sample 4 |  | 5.5 | 58.0 | 6.9 | 4.6 | 7.5 | 12.7 | 3.8 | 74.3 |
| Invention Sample 5 |  | 16.5 | 62.0 | 6.1 | 3.3 | 6.0 | 11.0 | 3.7 | 74.8 |
| Invention Sample 6 |  | 27.5 | 62.5 | 5.5 | 3.8 | 6.8 | 15.2 | 3.7 | 75.8 |
| Comparative Sample 3 | 35 | 0 | 54.0 | 9.2 | 3.7 | 6.1 | 15.3 | 3.5 | 66.3 |
| Invention Sample 7 |  | 5.0 | 55.0 | 8.4 | 3.2 | 5.9 | 12.4 | 2.8 | 73.4 |
| Invention Sample 8 |  | 14.6 | 54.0 | 8.1 | 3.0 | 4.8 | 12.2 | 2.4 | 72.6 |
| Invention Sample 9 |  | 24.3 | 57.0 | 6.1 | 2.3 | 4.2 | 8.9 | 3.0 | 69.7 |

From the results shown in Table 3, it is clear that the invention samples 1–3 and the comparative sample 1, the water-powder ratio thereof being 25%, show almost the same slump flow value, but 50 cm-flow time and L flow time of the invention samples 1–3 which are blended the aqueous slurry of ground calcium carbonate are shorter than those of the comparative sample 1 which is not blended the aqueous slurry. This means that flow speed of the invention samples 1–3 having short flow time is faster than that of the comparative sample 1 and fluidity is increased.

In the super high strength concrete, the water powder ratio thereof reaching to 25%, the fluidity of the concrete falls because the ratio of cement increases, and problems that the workability such as compressor efficiency, compaction workability finishing workability and etc., falls. How ever, even when the amount of ground calcium carbonate used as aqueous slurry is comparatively small, it is found that it can effectively solve the above problems in the concrete which has the water-powder ratio of 25%, such as the high strength concrete. Further, it turns out that the compressive strength of cured concrete of the invention samples 1–3 is found to be equal to that of the comparative sample 1. That is, even ground calcium carbonate having no binding ability, which is inherent in cement, is used in stead of a part of cement. it is understood that the compressive strength does not fall because the amount to be used is small.

In addition, from the result shown in Table 3, in the concrete which has the water-powder ratio of 30% and 35%, that is, the invention samples 4–9 and comparative samples 2 and 8 containing more water than the invention samples 1–3 and the comparative sample 1, it is found that, like the result obtained in samples having the water-powder ratio of 25%, slump flow value of invention samples 4–6 or the invention samples 7–9 is almost the same compared with that of comparative sample 2 or comparative sample 3, but 50 cm-flow time and L flow time of the former are shorter than those of the latter. This means the fluidity of concrete is improved and as to the compressive strength of cured concrete, they ate the almost the same level.

As shown in the result obtained in the invention samples 1, 4 and 7, it is found that even if the amount of ground calcium carbonate as aqueous slurry is very small, such as 10 kg per 1 $m^3$ or less, the workability of super high concrete, the water powder ratio thereof reaching to 25%, is improved, and this fact is a remarkable advantageous characteristics of the present invention which distinguish the present invention from the conventional concrete which needs comparatively large amount of the blast furnace slag fine powder or silica fume corresponding to the ground calcium carbonate in the present invention.

Example 2

In this example, the silica fume was also added as a fine particles ingredient (admixture) beside ground calcium carbonate added as aqueous slurry, and ingredients shown in Table 4 were used as a blending component. The mean particle diameter of the silica fume measured by the same method for measuring the mean particle diameter of ground calcium carbonate was 0.26 micrometers.

TABLE 4

Materials Used

| Blending component | Abbr. | Kind of Materials Used |
|---|---|---|
| Cement | OPC | High belite type cement, specific gravity 3.20 (Chichibu-Onoda Co. Ltd.) |
| Fine Aggregate | S1 | Fine sand from Ichihara(30%), specific gravity 2.54, FM 1.40 |
|  | S2 | Coarse sand from the Sagami River(70%), specific gravity 2.57, FM 3.20 |
| Coarse Aggregate | G | Crushed stone from Shiroyama, Tsukui-gun, specific gravity 2.66, percentage of absolute volume 57.2% |
| Admixture | FMT | Aqueous slurry of ground calcium carbonate obtained by wet-milling |
|  | SF | Silica Fume |
| Admixture | SP | Polycarboxylic acid type air entraining and high-range water reducing agent |

The same aqueous slurry of ground calcium carbonate used in example 1 was used.

TABLE 2

| Sample | W/P (%) | Unit (Kg/m3) W | C | FMT | SF | S1 | S2 | G | SP (%) |
|---|---|---|---|---|---|---|---|---|---|
| Comparative Sample 3 | 22 | 155 | 705 | 0 | 0 | 194 | 452 | 907 | 1.6 |
| Comparative Sample 5 |  |  | 635 | 0 | 70 | 186 | 435 |  | 2.0 |

TABLE 2-continued

| | W/P | Unit (Kg/m3) | | | | | | SP |
|---|---|---|---|---|---|---|---|---|
| Sample | (%) | W | C | FMT | SF | S1 | S2 | G | (%) |
| Invention Sample 10 | | | 635 | 21 | 49 | 186 | 435 | | 2.0 |
| Invention Sample 11 | | | 635 | 35 | 35 | 188 | 440 | | 2.0 |
| Invention Sample 12 | | | 670 | 35 | 0 | 192 | 449 | | 2.0 |

W/P: water–powder ratio, P = C + FMT + SF
Amount of Ingredient is shown as solid basis.

Based on the mix proportion shown in Table 5 using the ingredients shown in Table 4, the invention samples 10–12 and the comparative samples 4 and 5 were prepared respectively according to the following procedure.

Cement, the silica fume, the fine aggregate, and the coarse aggregate were fed into a mixer and were subjected to dry kneading for 30 seconds, then the air entraining and high-range water reducing agent, the aqueous slurry of ground calcium carbonate and water were added thereto, and the mixture was kneaded for 240 seconds. In this example, the aqueous ground calcium carbonate slurry was added after mixed with a part of water to be blended.

The slump flow test and L flow test were conducted to fresh concrete of the samples thus obtained and air content was also measured. Further, the compressive strength of age 28 days and 91 days of cured concrete of the samples was measured.

The results are shown are shown in Table 6.

TABLE 6

| Sample | W/P (%) | FMT (Kg/m3) | SF (Kg/m3) | Slump Flow (cm) | L Flow Time (sec.) | | | Air Volume (%) | Compressive Strength (N/mm3) | |
|---|---|---|---|---|---|---|---|---|---|---|
| | | | | | 30 cm | 40 cm | 50 cm | | 28 days | 91 days |
| Comparative Sample 4 | 22 | 0 | 0 | 73.5 | 16.0 | 23.6 | 34.9 | 2.1 | 93.0 | 98.0 |
| Comparative Sample 5 | | 0 | 70 | 66.0 | 4.2 | 7.8 | 13.6 | 3.3 | 84.1 | 103.1 |
| Invention Sample 10 | | 21 | 49 | 59.0 | 2.7 | 5.6 | 11.1 | 3.0 | 95.4 | 103.3 |
| Invention Sample 11 | | 35 | 35 | 63.0 | 4.2 | 7.1 | 12.0 | 3.2 | 95.6 | 111.5 |
| Invention Sample 12 | | 35 | 0 | 66.5 | 8.9 | 13.8 | 20.9 | 2.2 | 82.1 | 96.7 |

From the result shown in Table 6, it is found that L flow time of the invention sample 10 which contains both ground calcium carbonate and silica fume at a ratio of 3% and 7%, respectively based on the weight of cement including these admixture (hereinafter this ratio is called inner ratio) is shorter than that of not only comparative sample 4 which does not contain these admixture but also comparative sample 5 which contains only silica fume at the inner ratio of 10%. That is, the fluidity of the invention sample 10 containing both ground calcium carbonate and silica fume is improved compared with not only the comparative sample 5, which contains only silica fume, but also the comparative sample 4, which contains neither of these admixtures. Further, when the ground calcium carbonate and the silica fume are used together, the workability even in the super high strength concrete having the water-powder ratio of 22% is improved.

In addition, the L flow time of the invention sample 11, which contains both ground calcium carbonate and silica fume at the inner ratio of 5%, respectively, is greatly shortened compared with the comparative sample 4, which contains neither of them and almost the eme with that of the comparative sample 5 which contais silica fume at the inner ratio of 10%. That is, from comparison of the invention sample 11 with the comparative sample 5, it is possible to reduce the amount of silica fume to half by using the aqueous slurry of ground calcium carbonate in order to obtain almost the same L flow time. In other words, it is possible to achieve the desired workability in the conventional concrete which uses only silica fume as the admixture even if the amount of expensive silica fume to be added was reduced to half.

Furthermore, from comparison of the invention sample 12, which contains ground calcium carbonate but no silica fume with the comparative sample 4, which contains neither of these admixtues, the L flow time of the former was shortened to about half of that of the latter, while it took long time compared with the comparative sample 5, which contains silica fume at the inner ratio of 10%. Therefor, it is more advantageous to use the ground calcium carbonate together with silica fume as admixture in order to improve workability of the super high strength concrete having the water-powder ratio of about 20%

It is clear from the above explanation, according to the present invention, when aqueous slurry of ground calcium carbonate having the mean particle diameter of 0.5–3 micrometers is added to concrete, for example, high strength or super high strength concrete which has low water-powder ratio, the fluidity of the concrete is increased and the workability is improved.

By blending aqueous slurry of ground calcium carbonate, the fluidity of the conventional concrete which is added the blast furnace slag fine powder and silica fume is effectively improved. The workability improving effect is attained by using smaller amount of admixture than the amount of admixture used in the conventional concrete.

Further, ground ealcium carbonate can be obtained much easier from the technical viewpoint than blast furnace slag fine powder which has nearly the same particle size as the ground calcium carbonate. In addition, advantageous effect such that it is unnecessary to use expensive silica fume or it is possible to reduce the amount of silica is attained.

What is claimed is:

1. A method of preparing concrete having improved fluidity, the method comprises mixing cement with an aqueous slurry of limestone particles having a mean particle diameter of 0.5–3 micrometers and produced by wet pulverization of the limestone, wherein the ratio of water to the limestone in the aqueous slurry is 0.25 to 1.0 by weight and an amount of the limestone in the concrete is 5–150 kg/m$^3$ of the concrete.

2. The method of claim 1, which further comprises mixing silica fume with the cement and aqueous slurry, wherein the silica fume comprises silica particles having a mean particle diameter of 0.1–0.3 micrometers in a weight ratio of 0.1–9 to the limestone.

3. The method of claim 1, wherein the aqueous slurry further comprises a dispersant for the limestone particles.

4. The method of claim 1, which further comprises mixing aggregate with the cement and aqueous slurry.

5. The method of claim 1, wherein the amount of limestone is 10–100 kg/m$^3$.

6. The method of any one of claim 1, to 5, wherein the content of the limestone particles having a particle size of 2 micrometers or less in the aqueous slurry is 60% or more based on the total weight of the limestone.

* * * * *